US010015172B2

(12) United States Patent
McMichael, IV et al.

(10) Patent No.: US 10,015,172 B2
(45) Date of Patent: Jul. 3, 2018

(54) CREATION OF LINK TO USER PROFILE FROM USER INFORMATION PRIOR TO USER LOGON TO A VIRTUAL DESKTOP ENVIRONMENT

(71) Applicant: VMware, Inc., Palo Alto, CA (US)

(72) Inventors: Jack McMichael, IV, Denver, CO (US); Justin Venezia, Lexington, SC (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/749,305

(22) Filed: Jun. 24, 2015

(65) Prior Publication Data

US 2016/0381031 A1   Dec. 29, 2016

(51) Int. Cl.
H04L 29/06     (2006.01)
G06F 9/455     (2018.01)
G06F 9/445     (2018.01)
G06F 21/53     (2013.01)
G06F 9/451     (2018.01)

(52) U.S. Cl.
CPC .......... H04L 63/102 (2013.01); G06F 9/4451 (2013.01); G06F 9/452 (2018.02); G06F 9/45558 (2013.01); G06F 21/53 (2013.01); H04L 63/0876 (2013.01); G06F 9/45533 (2013.01); G06F 2009/45595 (2013.01); G06F 2221/2117 (2013.01)

(58) Field of Classification Search
CPC .............................. H04L 63/08; H04L 67/20
USPC ........................................................ 726/6
See application file for complete search history.

(56) References Cited

U.S. PATENT DOCUMENTS

| 8,141,075 B1* | 3/2012 | Chawla ............... | G06F 9/45558 718/1 |
| 2011/0088027 A1* | 4/2011 | Jelvis .................... | G06F 9/4411 717/174 |
| 2011/0107409 A1* | 5/2011 | Wilkinson ............ | G06F 21/335 726/8 |
| 2011/0185292 A1* | 7/2011 | Chawla ................. | G06F 9/5077 715/760 |
| 2012/0054742 A1* | 3/2012 | Eremenko ........... | G06F 9/45558 718/1 |
| 2012/0246639 A1* | 9/2012 | Kashyap ............. | G06F 9/45558 718/1 |
| 2013/0254761 A1* | 9/2013 | Reddy ................. | G06F 9/45558 718/1 |
| 2013/0290856 A1* | 10/2013 | Beveridge ............ | G06F 3/1454 715/740 |
| 2013/0290954 A1* | 10/2013 | Dorland .............. | G06F 9/45558 718/1 |
| 2013/0305244 A1* | 11/2013 | Pohlmann ............... | G06F 9/455 718/1 |

(Continued)

Primary Examiner — Haresh N Patel
(74) Attorney, Agent, or Firm — Patterson & Sheridan LLP

(57) ABSTRACT

Techniques for improving logon time for remote desktops a user has not logged onto before. In general, these techniques involve utilizing a pre-logon script to create a profile-specifying registry entry that links to an already created persistent or "mandatory" profile. Linking to a mandatory profile, rather than creating a new profile from whole cloth (which is automatically done by operating systems such as Microsoft Windows upon detecting a log on from a user that has not logged on before), reduces the amount of time associated with logging on.

20 Claims, 4 Drawing Sheets

(56) References Cited

U.S. PATENT DOCUMENTS

| | | | |
|---|---|---|---|
| 2014/0006346 A1* | 1/2014 | Davis | G06F 9/4451 707/613 |
| 2014/0164598 A1* | 6/2014 | Srinivasan | G06F 8/60 709/224 |
| 2015/0227384 A1* | 8/2015 | Zamir | G06F 8/65 718/1 |

* cited by examiner

CREATION OF LINK TO USER PROFILE FROM USER INFORMATION PRIOR TO USER LOGON TO A VIRTUAL DESKTOP ENVIRONMENT

BACKGROUND

Remote desktop products such as VMware® Horizon View™ allow users to remotely access virtual computing environments or "desktops." The flexibility associated with virtual machines (scalability, portability, and the like) means that such products are highly useful for computing environments that include a large number of public computers that are accessible by a large number of different users. Such computing environments are typically present in locations such as hospitals, where many different health care workers can access personal accounts at different locations. Many other uses are of course possible.

In such computing environments, it is often the case that users logging on to any particular desktop are doing so for the first time. When a user logs on to the desktop, an operating system within the desktop accepts user credentials and searches for a user profile associated with those credentials. If the operating system does not find such a user profile, the operating system creates one. In public computing environments such as those described above, users frequently log on to computers for the first time. Thus, computers frequently have to create new profiles for users. Unfortunately, the creation of new profiles represents a significant delay that negatively impacts user experience. For these reasons, better logon techniques are needed.

SUMMARY

A method is provided. The method includes receiving, via a connection broker, user credentials from a client device. The method also includes transmitting the user credentials and a request to execute a start session script to a host computer for execution prior to desktop logon. The method further includes executing the start session script prior to desktop logon, the start session script configured to cause the host computer to link a persistent user profile to unique user information for a user associated with the user credentials. The method also includes causing the host computer to perform an operating system logon based on the user credentials.

A virtualized desktop infrastructure system is provided that includes a connection broker, a domain controller, and a host computer. The connection broker is configured to receive user credentials from a client device and transmit the user credentials and a request to execute a start session script to a host computer for execution prior to desktop login. The host computer is configured to execute the start session script prior to desktop logon, the start session script configured to cause the host computer to link a persistent user profile to unique user information for a user associated with the user credentials and to perform an operating system logon based on the user credentials.

A non-transitory computer-readable medium storing instructions that, when executed by a processor, cause the processor to perform a method. The method includes receiving, via a connection broker, user credentials from a client device. The method also includes transmitting the user credentials and a request to execute a start session script to a host computer for execution prior to desktop logon. The method further includes executing the start session script prior to desktop logon, the start session script configured to cause the host computer to link a persistent user profile to unique user information for a user associated with the user credentials. The method also includes causing the host computer to perform an operating system logon based on the user credentials.

Further embodiments of the present invention include a non-transitory computer readable storage medium that includes instructions that enable a processing unit to implement one or more aspects of the above method, as well as a computer system configured to implement one or more aspects of the above method.

DETAILED DESCRIPTION

Figure 1:
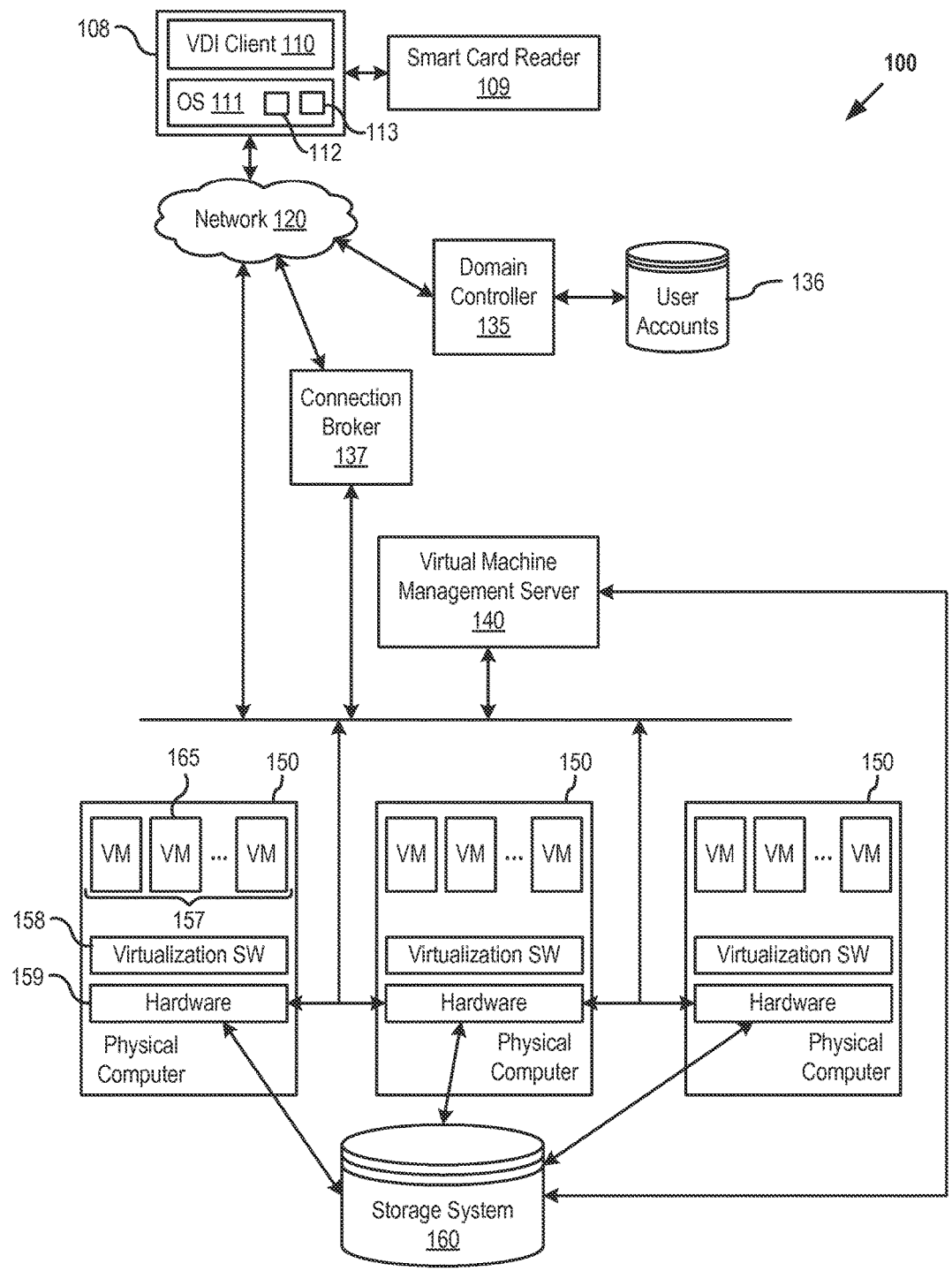
FIG. 1 illustrates components of a virtualized desktop infrastructure system in which one or more embodiments of the present invention may be implemented.

FIG. 1 illustrates components of a virtualized desktop infrastructure (VDI) system 100 in which one or more embodiments of the present invention may be implemented. In VDI system 100, VDI client software programs (also referred to as "VDI clients" for short), e.g., VDI client 110, run on operating systems of local computing devices, e.g., client machine 108 on top of an operating system (OS) 111. VDI clients provide an interface for users to access their desktops, which may be running in one of virtual machines 157 or blade server (not shown) in a data center that is remote from the user locations. The term, "desktop" refers to the instance of an interactive operating environment provided by a computer operating system and software applications, typically in the form of a display and sound output and keyboard and mouse input. With VDI clients, users can access desktops running in a remote data center through network 120, from any location, using a general purpose computer running a commodity operating system and a VDI client software program such as VMware® View™, or using a special purpose thin client such as those available from Dell, HP, NEC, Sun Microsystems, Wyse, and others.

VDI system 100 includes a domain controller 135, such as Microsoft® Active Directory®, that manages user accounts 136 including user log-in information, and a connection broker 137 that manages connections between VDI clients and desktops running in virtual machines 157 or other platforms. Domain controller 135 and connection broker 137 may run on separate servers or in separate virtual machines running on the same server or different servers. Virtual machines 157 are instantiated on a plurality of physical computers 150, each of which includes virtualization software 158 and hardware 159, are controlled by a virtual machine management server 140, and are coupled to a shared persistent storage system 160 which may persistently store data commonly used between virtual machines 157. Virtualization software 158 runs on hardware 159 of host systems 150 and "creates" virtual machines 157 for use by, for example, client device 108. More specifically, virtualization software 158 creates a virtualized version of a hardware computer by interfacing with hardware 159 and presenting to users of virtual machine 165 an interface that appears to be an actual computer.

All of the components of VDI system 100 communicate via network 120. For simplicity, a single network is shown but it should be recognized that, in actual implementations, the components of VDI system 100 may be connected over the same network or different networks. Furthermore, a particular configuration of the virtualized desktop infrastructure is described above and illustrated in FIG. 1, but it should be recognized that one or more embodiments of the present invention may be practiced with other configurations of the virtualized desktop infrastructure.

A user is permitted to sign on to a remote desktop via client device 108. User credentials that are used for sign on may be user ID and password when password authentication is used, and user principal name on a smart card certificate and a smart card PIN when smart card authentication is used. In the smart card embodiment, a smart card reader 109 is connected to client machine 108, and when the user's smart card is inserted into smart card reader 109, a user interface for inputting a smart card PIN is displayed to the user. Client machine 108 gains access to the certificates stored in the smart card only when the correct smart card PIN is entered.

To sign on, a user logs into client machine 108 by entering credentials. The user credentials are gathered by a component (such as authentication module 112) of OS 111 executing on client machine 108, which logs the user on. For security purposes, authentication module 112 may store the gathered credentials in a protected cache accessible only by processes that hold a trusted computing base privilege, such as system service 113.

Once logged into client machine 108, the user launches VDI client 110, which, as described above, provides an interface to a desktop executing in a VM 165. VDI client 110 may allow a user to perform a "single sign on," which allows sign on to both VDI client 110 and to operating system 208 executing the requested desktop in VM 165 with the user providing credentials only a single time (as opposed to multiple times). A user may indicate whether the user wishes to use the single sign on technique via user interface elements presented by VDI client 110 such as a check box. An administrator may disable the single sign on technique. If single sign on is selected, the user need not re-enter credentials when client machine 108 connects to the desktop.

VDI client 110 utilizes a connection broker 137 to log on to a desktop. To ensure that connection broker 137 is authorized to receive and retransmit user credentials, client device 108 authenticates connection broker 137 by verifying with domain controller 135 that connection broker 137 is authorized to delegate credentials from client device 108 to a desktop executing in a virtual machine 165.

Once connection broker 137 is authenticated, client device 108 communicates with domain controller 135 via connection broker 137 to authenticate the credentials for the user. Connection broker 137 exchanges messages with domain controller 135 to authenticate the user credentials. This message exchange may be performed in a secure manner, such as by using a hashed version of the password that was registered by the user that is maintained by domain controller 135 in user accounts 136. If connection broker 137, cooperating with domain controller, determines that the credentials entered are not correct, then authentication fails. A user may reenter credentials or may stop the authentication procedure. If connection broker 137 and domain controller 135 determine that the credentials are correct, then access is granted.

After access is granted and connection broker 137 is authenticated, client device 108, connection broker 137, and domain controller 135, cooperate to connect the client device 108 to a desktop executing on a VM 165 and to log the user onto that desktop. This is done by forwarding user credentials to the VM for log on to a local operating system and is described in further detail below with respect to FIGS. 2-4.

In the past, when a user, via a client machine 108, would connect to a desktop executing on a VM 165, an operating system executing in the desktop (such as Microsoft® Windows®) would check to determine whether a desktop profile exists for that user. A desktop profile, also referred to as a "user profile" herein, specifies information related to the desktop environment in which the user may interact with the operating system and applications. The desktop profile information may include information such as the background to display for the user, which applications the user is permitted to run, which locations contain important files such as documents, pictures, and the like, and other such information. If no desktop profile were to exist, then the operating system would create a new profile.

Because the process of creating a new profile typically causes a perceptible delay in the logon process, techniques are provided herein for reducing the amount of delay experienced by a user when the user logs on to a desktop that the user had not previously logged on to before. For purposes of illustration, some features of the embodiments described herein will be described in the context of the Microsoft Windows operating system, executing as the operating system on the VM that is presented to a user as the remote desktop. Those of skill in the art will understand, however, that the teachings presented herein may apply to systems that execute different operating systems for the remote desktop on VMs 165.

In general, these techniques involve utilizing a pre-logon script to create a profile-specifying registry entry that links to an already created persistent or "mandatory" profile. Linking to a mandatory profile, rather than creating a new profile from whole cloth (which is automatically done by Windows upon detecting a log on from a user that has not logged on before), reduces the amount of time associated with logging on in situations in which a user has not logged onto the desktop before.

Figure 2:
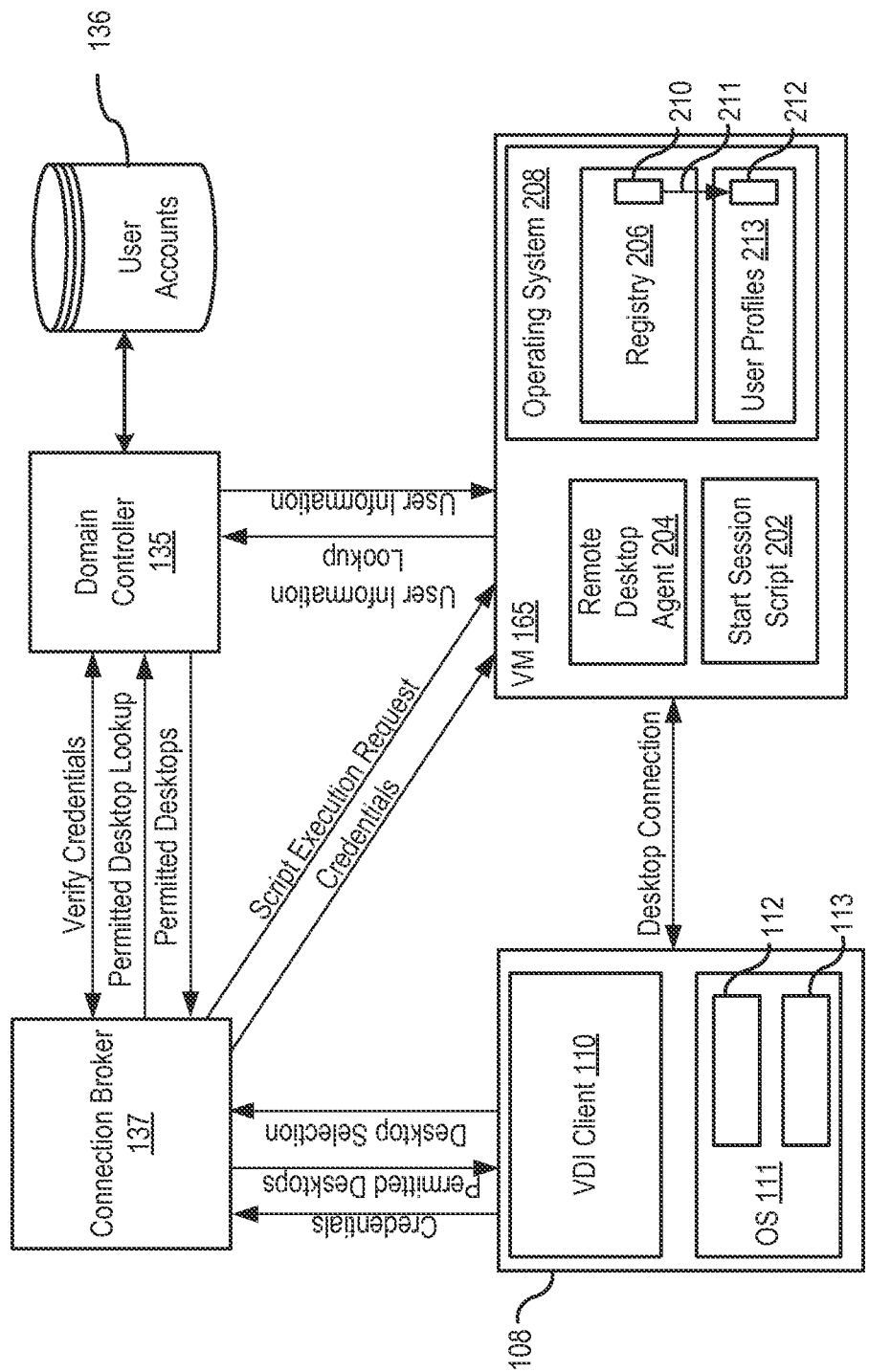
FIG. 2 is a more detailed illustration of the VDI system 100 of FIG. 1, illustrating techniques for fast logon, according to an example.

FIG. 2 is a more detailed illustration of VDI system 100 of FIG. 1, illustrating techniques for fast logon, according to an example. Elements shown in FIG. 2 include connection broker 137, client machine 108, domain controller 135 with user account information in persistent storage 136, and a VM 165.

As described above, to log a user into a remote desktop, a client machine 108 accepts user credentials from a user, transmits the credentials to connection broker 137, which verifies the credentials via domain controller 135. In response to verifying the credentials, connection broker 137 looks up desktops permitted to be accessed by the user associated with the credentials. Information that describes which desktops are permitted to be accessed by the user is stored with the user account information 136.

The permitted desktops represent different VMs 165 that may be accessed by a user. Different desktops may vary from one another in different ways, such as operating system version, hardware on which the desktop is executed, physical location of the hardware, logical location of the hardware, or the like. Domain controller 135 retrieves this permitted desktop information from user account information 136 and transmits the permitted desktop information to connection broker 137, which relays the permitted desktop information back to client machine 108.

Client machine 108 displays the permitted desktops on a user interface for a user, who selects one of the permitted desktops. In response, client machine 108 provides this permitted desktop selection to connection broker 137. Connection broker 137 contacts a particular VM 165 based on the selected desktop. Note that it is assumed that the credentials with which the user logs onto client device 108 are the same as those used to log on to the VM.

When VM 165 receives the credentials, operating system 208 executing within VM 165 has the option of immediately beginning the log on process for the user. More specifically, in "typical" Microsoft Windows logons, providing credentials to log on causes Microsoft Windows to begin a session. However, if the user has not logged on to the VM previously, then this log on process would include creation of a new profile, which would cause a delay for the user.

Therefore, instead of immediately beginning the log on process, connection broker 137 requests execution of start session script 202 by remote desktop agent 204. This start session script 202 is executed after VM 165 receives the credentials from connection broker 137. Again, in typical Microsoft Windows logons, there is no opportunity to execute a script prior to the session beginning, once logon credentials have been received. However, remote desktop agent 204 has the capability of executing a start session script 202 upon receiving logon credentials from connection broker 137 and prior to operating system 208 beginning its logon process.

Start session script 202 is configured to create a profile for the user in a manner that is different and faster than the manner in which operating system 208 would create the profile. Briefly, this profile creation involves creating a new registry key 210 within registry 206 and linking the newly created registry key 210 to a common, persistent (or "mandatory" in Windows terminology) user profile 212 (which is included within user profiles 213). The new registry key 210 uniquely identifies the user that provided the credentials, based on one or more unique user identification numbers (for example, a "SID" or security identifier, and/or a "GUID" or globally unique identifier, in Microsoft Windows).

In Windows, mandatory profiles are persistent in that users cannot modify them. Mandatory profile 212 is created before the user logon techniques shown in FIG. 2 occur. For example, an administrator may create mandatory profile 212 during desktop setup. Because mandatory profile 212 is already created and only being linked to by a registry entry for a new user, the amount of time consumed for log on for a new user is vastly reduced. More specifically, operating system 208 need not write the information associated with a new profile for the user.

In order to create the profile, remote desktop agent 204 requests unique identifiers (such as the SID and GUID) from domain controller 135, which provides those unique identifiers in response. Remote desktop agent 204 includes these unique identifiers in the newly created registry entry 210 and also includes a link 211 to mandatory profile 212 that has been created previously. After creating registry entry 210, remote desktop agent 204 logs the user on to operating system 208 based on the received credentials. Upon logging in, operating system 208 searches for registry entry 210 associated with the user. Because registry entry 210 has been created by remote desktop agent 208, operating system 208 finds registry entry 210. Operating system 208 examines registry entry 210, examines mandatory user profile 212, and determines that a valid profile exists for the user. Thus, operating system 208 proceeds to logging the user on and does not create a profile for the user. Subsequently, connection broker 137 hands off the connection so that client device 108 communicates directly with VM 165.

Figure 3:
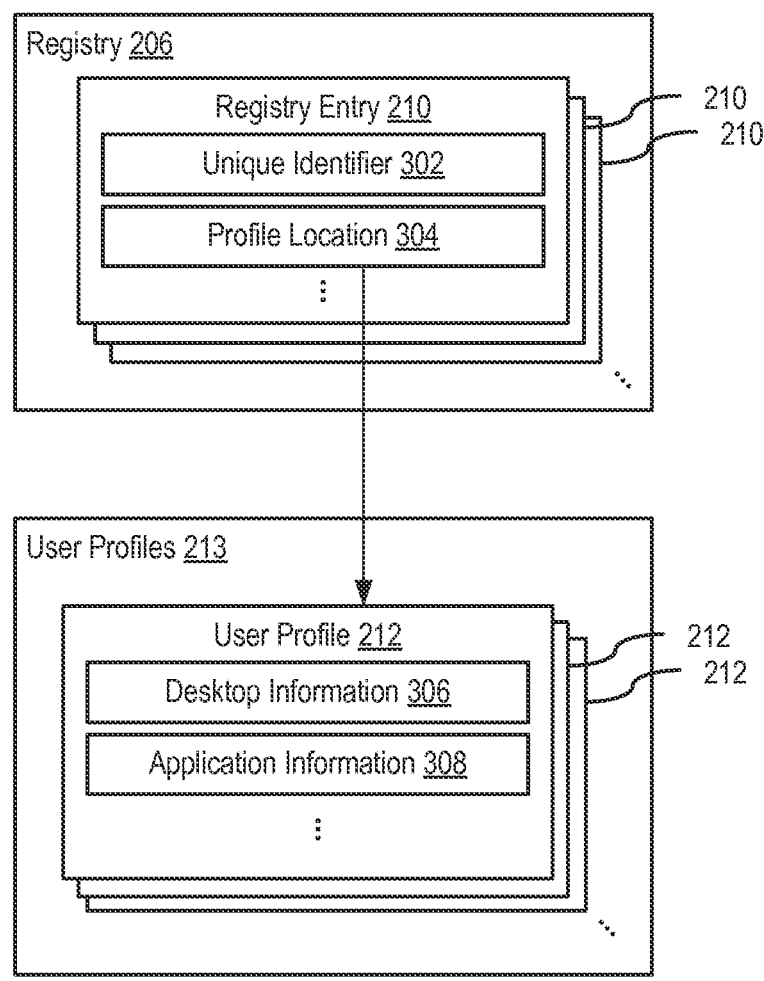
FIG. 3 illustrates the registry and user profiles shown in FIG. 2 in greater detail, according to an example.

FIG. 3 illustrates registry 206 and user profiles 213 shown in FIG. 2 in detail, according to an example. As shown, registry 206 includes multiple registry entries 210 and user profiles 213 include multiple user profiles 212. In Windows, registry 206 is a central repository of configuration and settings information for the operating system and for various applications. Registry 206 includes many different registry entries, including registry entries 210 that specify user profile information. It should be understood that although certain features are described herein in the context of the monolithic and centrally organized Windows registry, the techniques described herein may also be used with other operating systems that store user profile related information in a different manner.

Each registry entry 210 includes one or more unique user identifiers and a "path" that specifies the on-disk location of user profile 212 associated with the one or more unique user identifiers. The "disk" referred to is the disk of VM 165, which is generally stored as a virtual machine disk file ("VMDK file") by host computer 150. Registry entries 210 may also include various other information related to user logon. In Windows, the unique user identifiers include both a security identifier ("SID") and a globally unique identifier ("GUID") that specify the unique identity of a user. The path specifies a folder that describes the on-disk location of a user profile 212 associated with the user. In Windows, the path may be a path such as "C:\Users\VMware."

User profiles 213 are collections of user-specific data typically stored persistently in storage. In Windows, user profiles 213 are stored in a central location on disk such as "C:\Users" in Windows 7. Each user profile 212 is represented as a folder within the central location, an example being "C:\Users\VMware." A user profile 212 includes folders that specify and/or include, among other things, personal files such as personal documents, music, pictures, and videos, cached or saved searches, application-specific configuration data, personal contacts, downloads made by the user, a list of files, application shortcuts, and folders to be displayed on the user's desktop, and various other user-specific information.

When a user requests to be logged on to Windows, Windows searches a specific location within registry 206 (such as, for example, "HKEY_LOCAL_MACHINE\SOFTWARE\Microsoft\Windows NT\CurrentVersion\ProfileList") for a registry key that specifies profile data for the user to be logged in. If such a registry key exists, then Windows examines the key for the path that specifies user profile data. If a valid path exists and if the data stored at that path is valid, then Windows does not perform steps for creating a new profile for the user. However, if any of the described operations fail—for example, if a registry key does not exist for the user, if the path does not specify an existing directory, or if the path does not include necessary profile information, then Windows creates a new profile including a new registry entry and a new path for the user profile. When a user has never signed onto a particular desktop, Windows will not find a registry entry 210 for that user and will thus have to create new registry entry 210 as well as a new user profile 212 for that user.

Both of the act of creating a new registry entry 210 and the act of creating a new user profile 212 consume a significant amount of time with creating a new user profile 212 taking significantly more time. For this reason, when executed prior to logging the user on in VM 165, start session script 202 creates a registry entry 210 for the user that is logging on. Further, instead of creating a new user profile 212, start session script 202 instead simply specifies, as profile location 304 within new registry entry 210, the on-disk location of an already prepared "mandatory" user profile 212. As described above, a mandatory user profile 212 is a user profile that cannot be changed through normal operations performed by a user. For example, if a user removes or adds items to the desktop, removes or adds applications to a list of applications that the user can access, or makes other changes to the user profile, Windows does not save such changes to mandatory user profile 212 when the user logs off Through use of start session script 202, no user profile 212 is created. Thus, the time consumed by a new user logon is greatly reduced when using start session script 202 as compared to a traditional new user logon, for which a new user profile is created.

Figure 4:
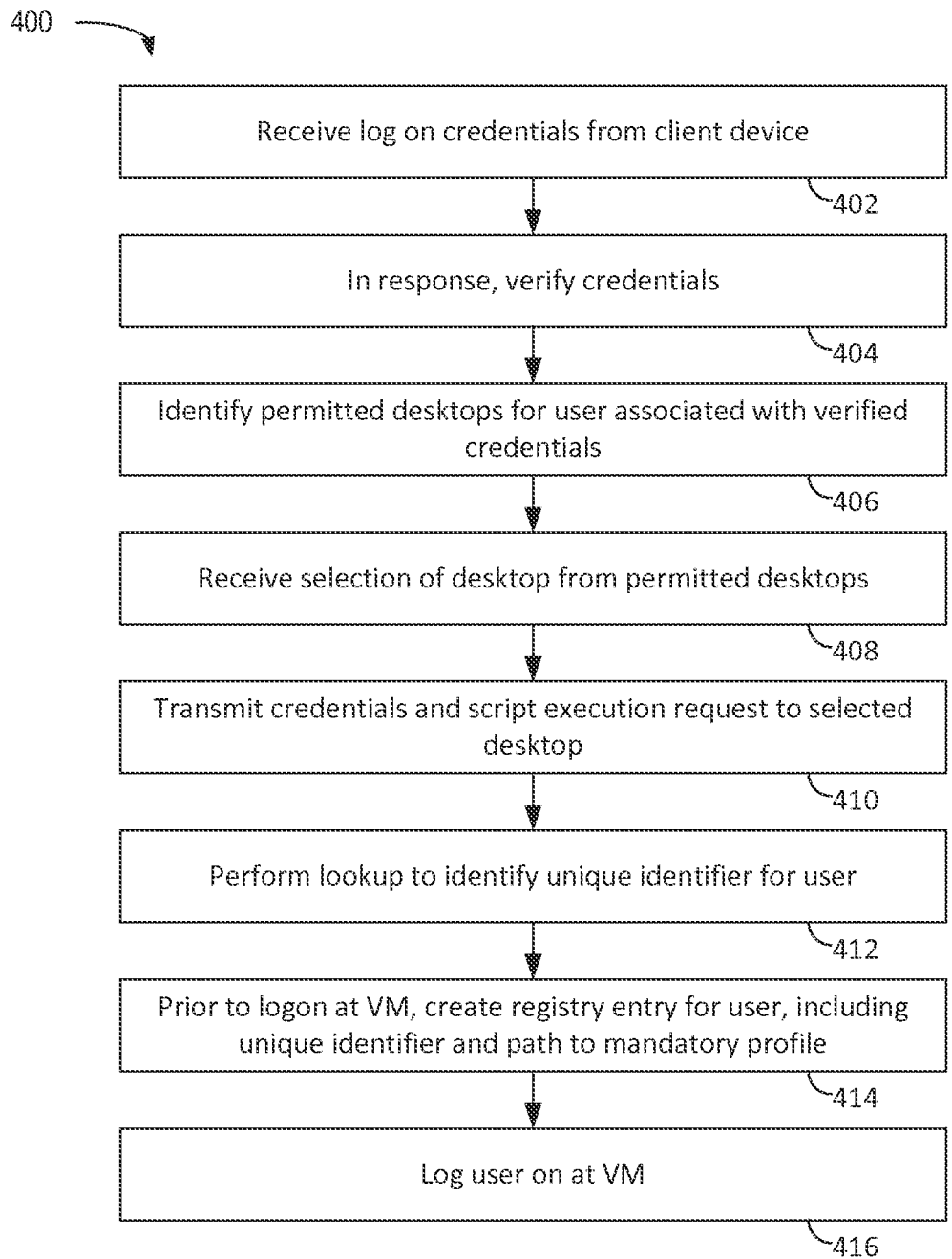
FIG. 4 is a flow diagram that illustrates steps for a method of creating a profile at user logon, according to an example.

FIG. 4 is a flow diagram that illustrates steps for a method 400 of creating a profile at user logon, according to an example. It should be recognized that, even though the method is described in conjunction with the system of FIGS. 1-3, any system configured to perform the method steps, in any technically feasible order, is within the scope of the present disclosure.

As shown, method 400 begins at step 402, where connection broker 137 receives credentials from a client system 108. The credentials serve to verify the identity of a user using client device 108 and may consist of a combination of user name and password or of credentials of other types. In various embodiments, client device 108 receives the credentials from a user or from a device such as a smart card, or the like. A user may enter the credentials at a logon interface presented by VDI client 110.

At step 404, connection broker 137 verifies the credentials provided by client system. Connection broker 137 verifies the credentials by communicating with domain controller 135, which accesses user account information 136 stored in persistent storage.

Once the credentials are verified, at step 406, connection broker 137 requests a list of permitted desktops from user account information 136 via domain controller 135. These permitted desktops constitute virtualized operating systems that user account information 136 indicates the authenticated user is permitted to access. Connection broker 137 provides this list of permitted desktops to client device 108 for presentation to a user.

At step 408, connection broker 137 receives a desktop selection from client device 108. This desktop selection may be received from a user after client device 108 presents a list of desktops to the user for selection. In response to such a selection, client device 108 may transmit an indication of the selection to connection broker 137.

At step 410, connection broker 137 identifies a VM 165 as the selected desktop and transmits the user credentials as well as a request to execute start session script 202 for fast profile creation to identified VM 165. Remote desktop agent 204 executes start session script 202 prior to allowing operating system 208 to perform a logon for the user based on the credentials, in order to prevent operating system 208 from performing a slower profile creation.

At step 412, in accordance with start session script 202, remote desktop agent 204 performs a lookup via domain controller 135 to obtain unique identifiers for the user. The unique identifiers may include alphanumerical values that uniquely identify the user within VDI system 100. At step 414, prior to causing the operating system to log the user on, remote desktop agent 204, in accordance with start session script 202, creates a registry entry 210 for the user that both uniquely identifies the user and identifies the location of mandatory user profile 212. At step 416, remote desktop agent 204 causes operating system 208 to log the user on. Because a valid registry entry 210 that points to a valid mandatory user profile 212 (which happens to be a mandatory user profile) exists, operating system 208 does not create a new user profile 212 for the user. Thus, the time associated with creation of a new user profile 212 is not expended and the sign on process is faster than if operating system 208 were to create new user profile 212.

As used herein, a "connection broker" is any apparatus that is configured to manage connections to remote user sessions such as remote desktops, and a "domain controller" is any apparatus that is configured to have access to and manage user log-in information.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method, comprising:
   creating a mandatory profile;
   receiving a request from a first user to log into a non-persistent desktop environment executing on a virtual machine;
   before the non-persistent desktop environment receives the request from the first user, executing a start session script to load the mandatory profile into memory and create a first user profile that points to the mandatory profile in memory;
   after executing the start session script, logging the first user into the non-persistent desktop environment;
   logging the first user out of the non-persistent desktop environment and maintaining the mandatory profile in the memory;
   receiving a request from a second user to log into the non-persistent desktop environment;
   before the non-persistent desktop environment receives the request from the second user, executing the start session script in a virtual machine running in the host computer to create a second user profile that points to the mandatory profile previously loaded into the memory and maintained in the memory after the first user logged out; and
   after executing the start session script, logging the second user into the non-persistent desktop environment.

2. The method of claim 1, wherein the first user profile points to the mandatory profile via a registry entry.

3. The method of claim 1, wherein the registry entry includes unique user information and an indication of an on-disk location for the mandatory profile.

4. The method of claim 1, wherein the mandatory profile includes a list of permitted applications, locations for personal documents, and a desktop background.

5. The method of claim 1, wherein the first user profile comprises a security identifier and a globally unique identifier.

6. The method of claim 5, further comprising obtaining, by a host computer, the security identifier and the globally unique identifier from a domain controller coupled to persistent storage storing user account information.

7. The method of claim 1, wherein the start session script is executed prior to logon to an operating system of the virtual machine.

8. A virtualized desktop infrastructure system comprising a host computer running a virtual machine, wherein the host computer is configured to:
   create a mandatory profile;
   receive a request from a first user to log into a non-persistent desktop environment executing on the virtual machine;
   before the non-persistent desktop environment receives the request from the first user, execute a start session script to load the mandatory profile into memory and create a first user profile that points to the mandatory profile in memory;
   after executing the start session script, log the first user into the non-persistent desktop environment;
   log the first user out of the non-persistent desktop environment and maintain the mandatory profile in the memory;
   receive a request from a second user to log into the non-persistent desktop environment;
   before the non-persistent desktop environment receives the request from the second user, execute the start session script in a virtual machine running in the host computer to create a second user profile that points to the mandatory profile previously loaded into the memory and maintained in the memory after the first user logged out; and
   after executing the start session script, log the second user into the non-persistent desktop environment.

9. The system of claim 8, wherein the first user profile points to the mandatory profile via a registry entry.

10. The system of claim 9, wherein the registry entry includes unique user information and an indication of an on-disk location for the mandatory profile.

11. The system of claim 8, wherein the mandatory profile includes a list of permitted applications, locations for personal documents, and a desktop background.

12. The system of claim 8, wherein the first user profile comprises a security identifier and a globally unique identifier.

13. The system of claim 12, wherein the host computer is further configured to obtain the security identifier and the globally unique identifier from a domain controller coupled to persistent storage storing user account information.

14. The system of claim 8, wherein the start session script is executed prior to logon to an operating system of the virtual machine.

15. A non-transitory computer-readable medium storing instructions that, when executed by a processor, cause the processor to perform a method, the method comprising:
   creating a mandatory profile;

receiving a request from a first user to log into a non-persistent desktop environment executing on a virtual machine;

before the non-persistent desktop environment receives the request from the first user, executing a start session script to load the mandatory profile into memory and create a first user profile that points to the mandatory profile in memory;

after executing the start session script, logging the first user into the non-persistent desktop environment;

logging the first user out of the non-persistent desktop environment and maintaining the mandatory profile in the memory;

receiving a request from a second user to log into the non-persistent desktop environment;

before the non-persistent desktop environment receives the request from the second user, executing the start session script in a virtual machine running in the host computer to create a second user profile that points to the mandatory profile previously loaded into the memory and maintained in the memory after the first user logged out; and after executing the start session script, logging the second user into the non-persistent desktop environment.

16. The non-transitory computer-readable medium of claim 15, wherein the first user profile points to the mandatory profile via a registry entry.

17. The non-transitory computer-readable medium of claim 15, wherein the registry entry includes unique user information and an indication of an on-disk location for the mandatory profile.

18. The non-transitory computer-readable medium of claim 15, wherein the mandatory profile includes a list of permitted applications, locations for personal documents, and a desktop background.

19. The non-transitory computer-readable medium of claim 15, wherein the first user profile comprises a security identifier and a globally unique identifier.

20. The non-transitory computer-readable medium of claim 15, wherein the start session script is executed prior to logon to an operating system of the virtual machine.

* * * * *